(12) United States Patent
Royal, Jr. et al.

(10) Patent No.: US 6,176,421 B1
(45) Date of Patent: Jan. 23, 2001

(54) FUEL DISPENSER ARCHITECTURE HAVING SERVER

(75) Inventors: William C. Royal, Jr., Greensboro; Randall O. Watkins, Stokesdale, both of NC (US)

(73) Assignee: Marconi Commerce Systems Inc., Greensboro, NC (US)

(*) Notice: Under 35 U.S.C. 154(b), the term of this patent shall be extended for 0 days.

(21) Appl. No.: 09/245,135

(22) Filed: Feb. 4, 1999

(51) Int. Cl.$^7$ .................................................. G06F 7/08
(52) U.S. Cl. ................................... 231/381; 700/241
(58) Field of Search ........................ 235/381, 375, 235/383, 162.01; 700/241, 231, 244, 236

(56) References Cited

U.S. PATENT DOCUMENTS

| | | | |
|---|---|---|---|
| 4,345,146 | * 8/1982 | Story et al. ............................. | 235/381 |
| 4,469,149 | * 9/1984 | Walkey ................................. | 235/381 |
| 5,327,066 | * 7/1994 | Smith .................................... | 320/2 |
| 5,500,890 | 3/1996 | Rogge et al. ......................... | 379/91 |
| 5,557,268 | 9/1996 | Hughes et al. ....................... | 340/933 |
| 5,572,643 | 11/1996 | Judson ................................. | 395/793 |
| 5,583,940 | 12/1996 | Vidrascu et al. ..................... | 380/49 |
| 5,588,060 | 12/1996 | Aziz ..................................... | 380/30 |
| 5,590,197 | 12/1996 | Chen et al. ........................... | 380/24 |
| 5,934,508 | * 8/1999 | Kenney et al. ....................... | 222/55 |
| 6,052,629 | * 4/2000 | Leatherman et al. ................ | 700/241 |
| 6,067,008 | * 5/2000 | Smith ................................... | 340/438 |
| 6,070,156 | * 5/2000 | Hartsell, Jr. .......................... | 705/413 |

OTHER PUBLICATIONS

Joseph, Tarnowski *Management by Exception*, Journal of Petroleum Marketing, Nov. 1998. pp. 41–50.

* cited by examiner

Primary Examiner—Thien M. Le
(74) Attorney, Agent, or Firm—Coats & Bennett, P.L.L.C.

(57) ABSTRACT

A fuel dispenser having a server is disclosed. The fuel dispenser server is adapted to dynamically or periodically create electronic documents reflecting fuel dispenser data for viewing remote to the fuel dispenser. A network connection provides connectivity of the server to remote clients. The fuel dispenser with a server is relatively inexpensive to produce and is ideally suited for remote troubleshooting and for interaction with a dispenser customer.

39 Claims, 12 Drawing Sheets

FUEL DISPENSER ARCHITECTURE HAVING SERVER

BACKGROUND OF THE INVENTION

The invention relates generally to fuel dispensers, and more particularly, to fuel dispensers and fuel dispensing systems having a network server providing generated documents reflecting stored data to a user. Recently, fuel dispensers have evolved into complicated systems that provide and store large amounts of data pertaining to fuel delivery and customer interaction. For example, dispensers may include a customer interface having a point-of-sale (POS) system for ordering foods from associated restaurants and services such as car washes; card readers for accepting payment for fuel, goods and services at the dispenser; and displays for ordering and commercial advertising. Additionally, modern fuel dispensers can facilitate a service station owners' maintenance of the dispenser by accumulating inventory information and monitoring overall dispenser status.

As the complexity of these devices increases, the volume and types of data that a fuel dispenser can generate increases, as well as the potential for faults and dispenser failure. As this information increases in volume and type, the number of ways to present the data increases as well. Accordingly, dispenser suppliers, oil companies, and owners need an economical and efficient way to access this data on both new and pre-existing dispensers. Each of these entities often wants access to different information viewable in different formats. Until applicants' invention, the only way that most of this data could be accessed was to be at the same site as the dispenser, significantly limiting the personnel available to analyze the dispenser's inventory and maintenance data. Presentation of the data was usually inflexible. Furthermore, maintenance problems generally required several trips to the dispenser: one to diagnose the problem, and others to fix the problem. Thus, there is a need for a dispenser configured to efficiently gather inventory status and maintenance information and provide this data to different entities in different locations in a variety of user configurable formats.

SUMMARY OF THE INVENTION

Applicants fulfill this need by providing a fuel dispenser system having a plurality of dispensers, each dispenser having a server. Each dispenser typically has two fueling positions, each with a graphical user interface (GUI) through which a customer interacts, as well as a control system and associated hardware and software to control and monitor varied aspects of the fuel dispenser system. The server operates in conjunction with existing hardware and software in the fuel dispenser system to provide a flexible and backwards compatible system that allows access to the control system, GUI, and related data through clients at nearly any remote location.

Each fuel dispensing system can also connect to a variety of networks in a variety of ways. The fuel dispensing system typically connects to a station server, which in turn may connect to an internal network, such as a corporate intranet, and to an external network, such as the internet. The external network may only connect to the internal network and rely on the internal network's connection with the station server to access the fuel dispensing system. The fuel dispensing system may also directly connect to an external network, bypassing the internal network and the station server. Providing such flexible network connectivity allows data access routes unavailable without applicant's invention.

The invention provides a fuel dispensing system capable of generating documents reflecting fuel dispenser data and serving these documents to a remote client, typically a hypertext markup language (HTML) compliant browser such as Netscape or Internet Explorer, via the hypertext transfer protocol (HTTP). HTTP is a known application protocol that provides users access to files, which can be in different formats such as text, graphics, images, sound and video, using a standard page description language known as hypertext mark-up language (HTML). HTML provides basic document formatting and allows the developer to specify links to other servers and files therein. Use of an HTML compliant client browser involves specification of a link via a uniform resource locator (URL). Upon such specification, the client makes a request to the server identified in the link and receives a web page, basically, a document formatted according to HTML, in return. HTML provides exceptional freedom in creating graphics/text/graphic images and associated audio between servers and clients. HTTP and HTML allow complex services to be accessed by clients having a minimum amount of hardware sophistication. Furthermore, since HTTP and HTML are standard, portable systems, the client can be one of many browsers running on almost any platform.

Typically, a user will access the fuel dispenser's server with a browser running on a client terminal connected to the station server, the internal network, or an external network. The browser will request a page from the server, and the server will retrieve the desired page and send it as an HTML formatted document back to the browser for the user to view. Therefore, applicant's invention allows a user to configure and analyze the dispensing system from almost any location that has a telephone line, no longer requiring an initial hands-on look at the system. With the invention, a user could eliminate travel time as well as equipment costs by being able to view system data from wherever they are without having to travel to the dispenser's actual location. Before applicant's invention, multiple trips were sometimes necessary and unneeded equipment had to be transported in order to troubleshoot what can be done remotely with applicant's invention.

The invention also provides for automatically generating documents which reflects the current, up to date status of the fuel dispenser, including control system, server, and GUI related data. In a preferred embodiment, the server is adapted to automatically generate the documents, either dynamically or on a scheduled basis. The server receives either a dynamic client request or a scheduled request and subsequently creates the requested document. The server can receive this request from a plurality of devices, including the station server, station controller, an internal or external network terminal client, the fuel dispenser's control system, or the server itself.

Alternatively, the invention could include a server extension to facilitate communications between the server and a fuel dispenser's control system. In this embodiment of the invention, the server extension would receive the control signal or request and then create the page on either a dynamic or scheduled basis. The server extension would also be capable of receiving the requests from a plurality of devices, including the station server, a station controller, an internal or external network terminal client, the fuel dispenser's control system, the server, or the server extension itself. In this embodiment of the invention, the server extension would create the page and the server would transmit the document to the browser on the remote client.

The invention's flexibility and upgradeability lies in the fact that a server and server extension may be integrated or separate, not only with respect to each other, but also with respect to a fuel dispenser's control system. Furthermore, the server and server extension may be implemented as software or hardware solutions. Providing such a flexible means of implementing the invention makes the invention a simple retrofit to a large variety of in-use dispenser systems, as well as simplifying future installations.

The invention is preferably implemented in a dispenser having a processor, operating system, HTTP-compliant server, server extension and GUI running an HTTP-compliant browser. The dispenser's control system and dispenser electronics also generate data, which in turn will be stored in the control system's memory.

The server's communications interface will be used to provide remote connectivity to the dispenser, preferably via the TCP/IP protocol. Therefore, a user could remotely troubleshoot a fuel dispenser at any location with a terminal client, browser, and World Wide Web (WWW) access. Furthermore, a refueling customer can provide information to generate a page as well, providing instantaneous communication with a remote user. By using a standard protocol, and a standard, portable document format such as HTML, the invention can easily be assimilated into virtually any Information Systems (IS) infrastructure without requiring the purchase of new hardware on the client side, as well as allowing the use of an already implemented network infrastructure on the server and network side. In short, applicant's invention allows the fullest use of existing hardware and software while keeping costs to a minimum. By providing a flexible system, both for implementation and access, the invention insures that application of the invention will not be so expensive as to outweigh the benefits.

These and other aspects of the present invention will become apparent to those skilled in the art after reading the following description of the preferred embodiments when considered with the drawings.

DETAILED DESCRIPTION OF THE PREFERRED EMBODIMENT

Figure 1:
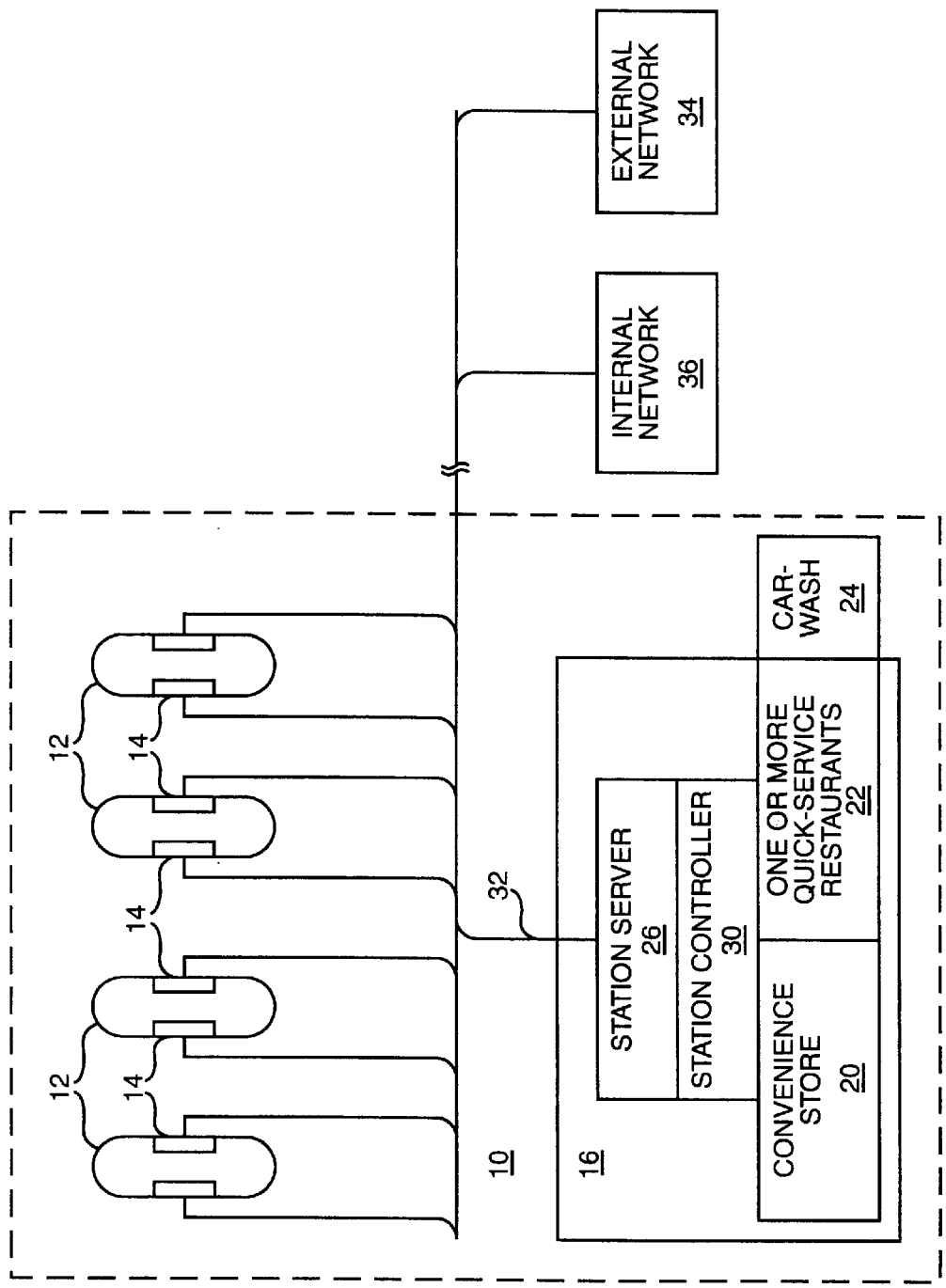
FIG. 1 is a diagram of a fuel station store having dispensers and a local station server connected to internal and external networks according to the present invention.

In the following description, like reference characters designate like or corresponding parts throughout the several figures. It should be understood that the illustrations are for the purpose of describing preferred embodiments of the invention and are not intended to limit the invention thereto.

Referring now to the drawings in general, and FIG. 1 in particular, it will be understood that the illustrations are provided to describe a preferred embodiment of the invention and are not intended to limit the invention thereto. A fuel station environment 10 is shown having a plurality of fuel dispensers 12. Each dispenser 12 typically has at least two fueling positions 14 capable of delivering fuel and providing a point-of-sale (POS) interface.

A main service station store 16 is operably connected to each dispenser 12 and fueling position 14 in addition to a local station server 26 and station controller 30. The station server 26 and station controller 30 are operationally associated with POS systems and/or transaction systems for a convenience store 20 and one or more quick service restaurants 22, an associated car wash 24 or other service provider. In the preferred embodiment, a fuel dispenser may link via network connection 32 to an external network 34, an internal network 36, and/or to the local station server 26. The dispensers include the normal fuel delivery hardware required to deliver fuel to a customer in a controlled manner, such as pumps, flow control valves, nozzles, hoses and control electronics. Importantly, the dispensers 14 will also include a dispenser server.

Figure 2:
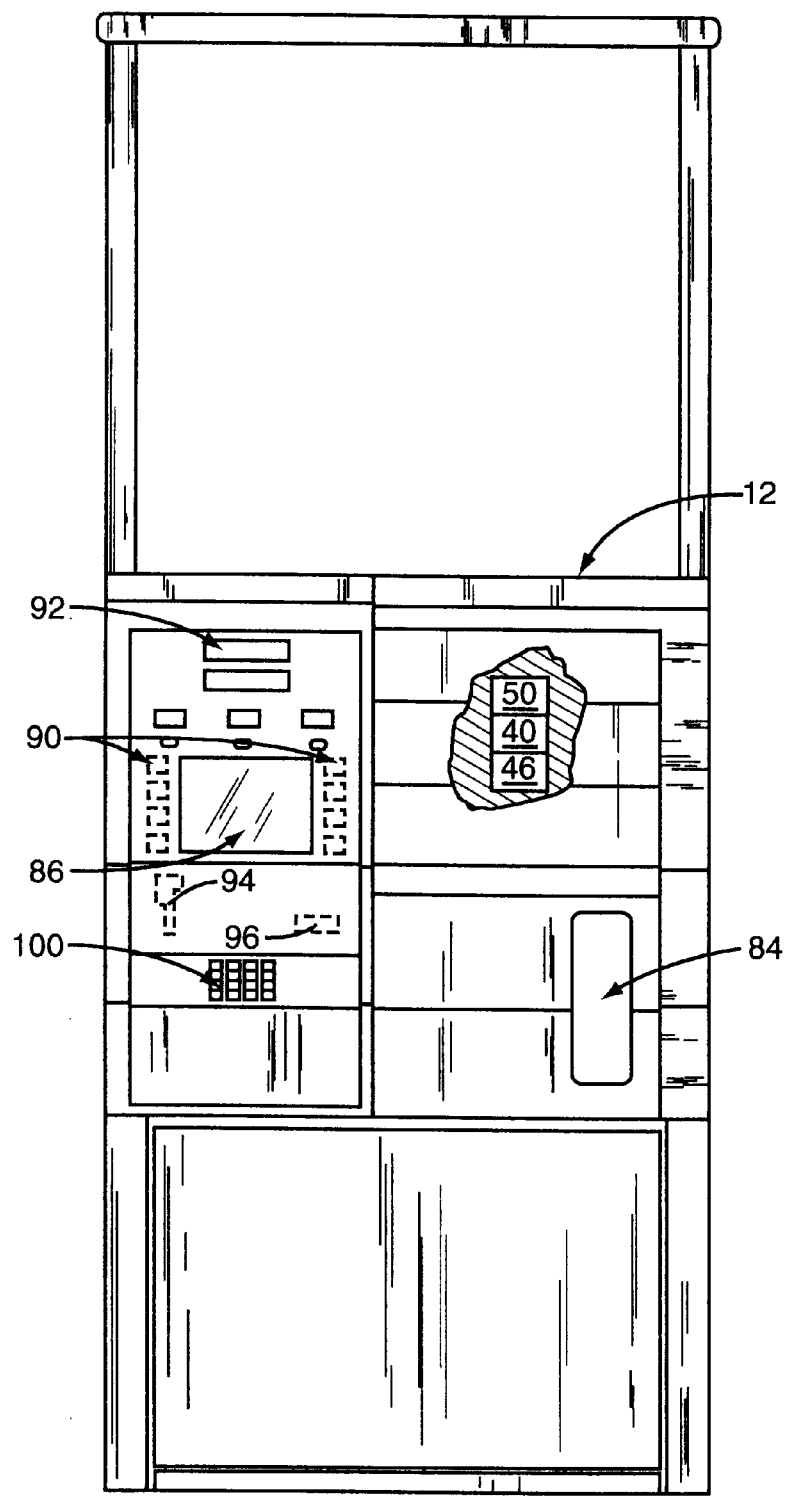
FIG. 2 is a front view of a fuel dispenser as described in FIG. 1 containing a server, server extension, and control system.

Turning to FIG. 2, a front view of a fuel dispenser 12 is shown with a cutaway to show the dispenser controller system 50, dispenser server 40 and associated server extension 46. The fuel dispenser 12 is provided with a display 86, adjacent touchpads 90, metering device 92, magnetic card reader 94, receipt discharge 96, and numeric keypad 100, each of which may be connected to the controller system 50, dispenser server 40, and/or server extension 46. Thus, the dispenser server 40 enhances the apparatus by providing a method to store a large variety of data generated by the dispenser 12.

The dispenser server 40 is associated with a communications interface, to facilitate communications with the dispenser 12 and with remote locations via the network connection 32. The dispenser server 40 is also associated with a server extension 46, which may be integrated or separate from the dispenser server 40. The server extension may be implemented in software, hardware, or a combination thereof.

Figure 3:
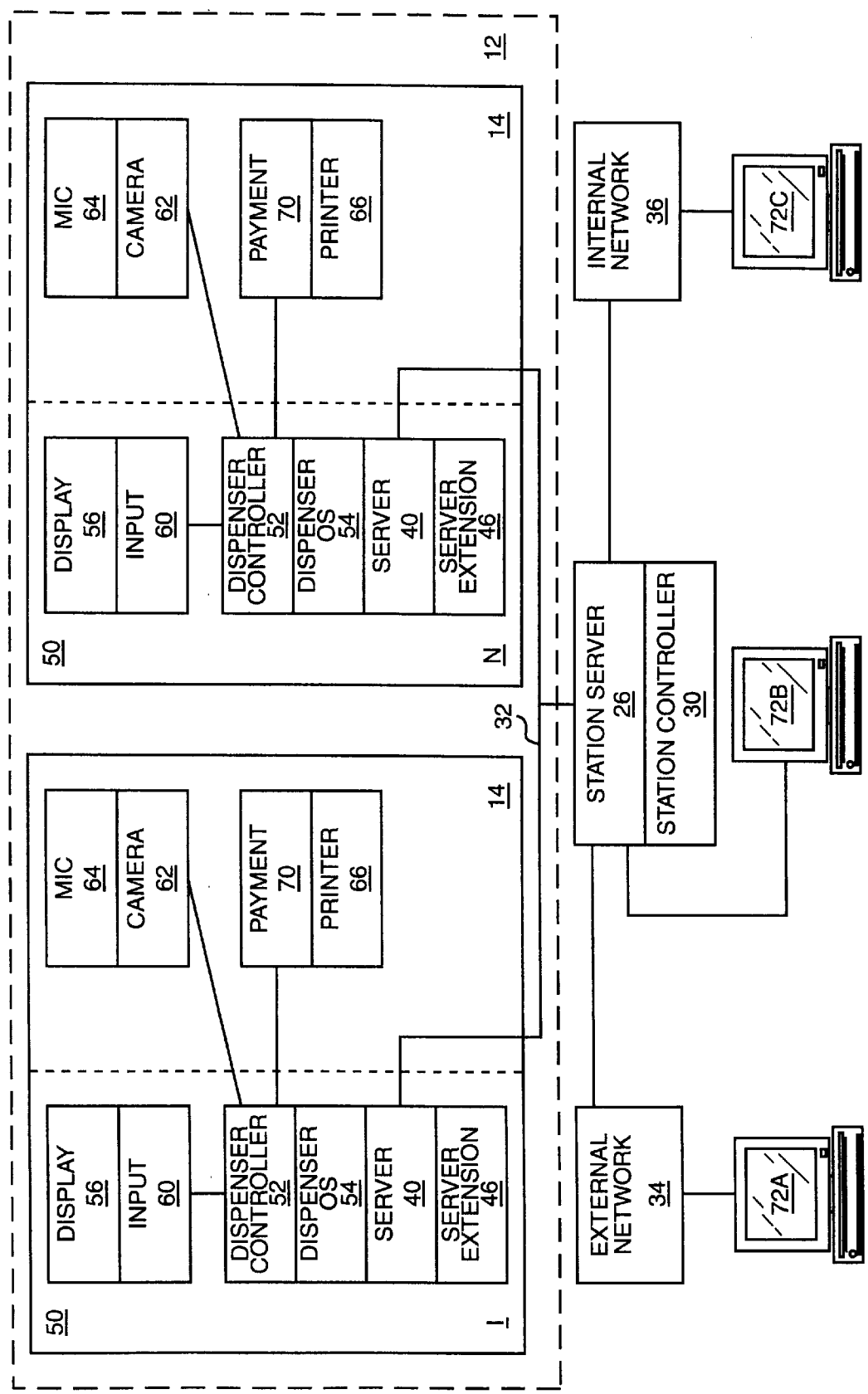
FIG. 3 is a schematic of the fuel dispensing system architecture of the system of FIG. 1, with internal and external network access to the fuel dispensers via the station server, with accompanying access devices.

Turning now to FIG. 3, a fueling position 14 for each dispenser 12 is shown in greater detail. Each fueling position is associated with a control system 50, containing a dispenser controller 52, dispenser operating system 54, dispenser server 40, server extension 46, display 56 and input device 60, such as a keyboard, touch pad or touch screen. The display 56 and input device 60 in conjunction with the dispenser controller 52, provide a graphical user interface for each fueling position 14. The dispenser operating system 54 is preferably adapted to run any number of software applications required to operate the dispenser, graphical user interface, dispenser server 40 and/or server extension 46. Each fueling position 14 may also include a printer 66 and payment accepting device 70, such as a magnetic strip card reader, smart card reader, or currency acceptor, in addition to a camera 62 and microphone 64 to provide an audio or audio/video intercom with a similarly equipped server or system. Other payment systems may be substituted.

Each graphical user interface may include its own control system or operate in conjunction with a single control system adapted to operate both interfaces on a single dispenser 12. In a preferred configuration of the invention, each fueling position 14 acts as a thin server capable of interacting with a network of clients. The dispenser controller 52 and associated user interfaces are preferably designed to minimize the hardware commitment necessary at each dispenser, while having sufficient capability to establish interactivity with local and/or networked clients and provide fuel dispenser control.

The station server 26 and station controller 30 will preferably be attached to a client terminal 72B. The client terminal 72B may connect directly to the station server 26 via the network 32 or, in the alternative, may attach to the station controller 30 as a dumb terminal. The station controller 30 is typically a central site controller used to interface and control pump operation, certain dispenser and store transactions as well as general control of the fuel station store. The station controller 30 may also facilitate station operator interaction with a fueling position 14 through terminal 72B. The local server preferably controls interactivity with the local network 32 and/or the dispensers 12.

The basic system architecture is a local network 32 connecting the dispensers 12, the local station server 26, an internal network 36 and/or an external network 34. Each fueling position 14 is treated as a server capable of generating data for access through the station server 26, the internal network 36 and/or the external network 34. Interactivity between the fueling positions 14 and the local station server 26, the internal network 36 and/or the external network 34 is accomplished in a manner similar to the way interactivity is accomplished on the Internet, and preferably, identical to the manner in which interactivity is accomplished on the Internet. The system preferably uses HTML and HTML-compliant components, media players, and services. For local access, a user can use station server 26, station controller 30, or client terminal 72B. For remote access, a user can use client 72A or 72C, attached to external 34 and internal 36 networks respectively.

Access to the dispenser operating system 54 and dispenser server 40 through an external network 34 will most likely occur via the Internet. The Internet is a known computer network based on the client-server model. Basically, the Internet comprises a large network of servers accessible by clients, such as client 72A. Each of the clients operates a browser, which is a known software tool used to access servers through Internet access providers. A server operates a "web site" which supports files in the form of documents and pages. A network path to the documents created by a web server is identified by a uniform resource locator (URL) having a known syntax for defining a network connection. Under the configuration shown in FIG. 3, a client request will route through the external network 34 and the station server 26 to reach the dispenser server 40 on the dispenser 12.

Figure 4:
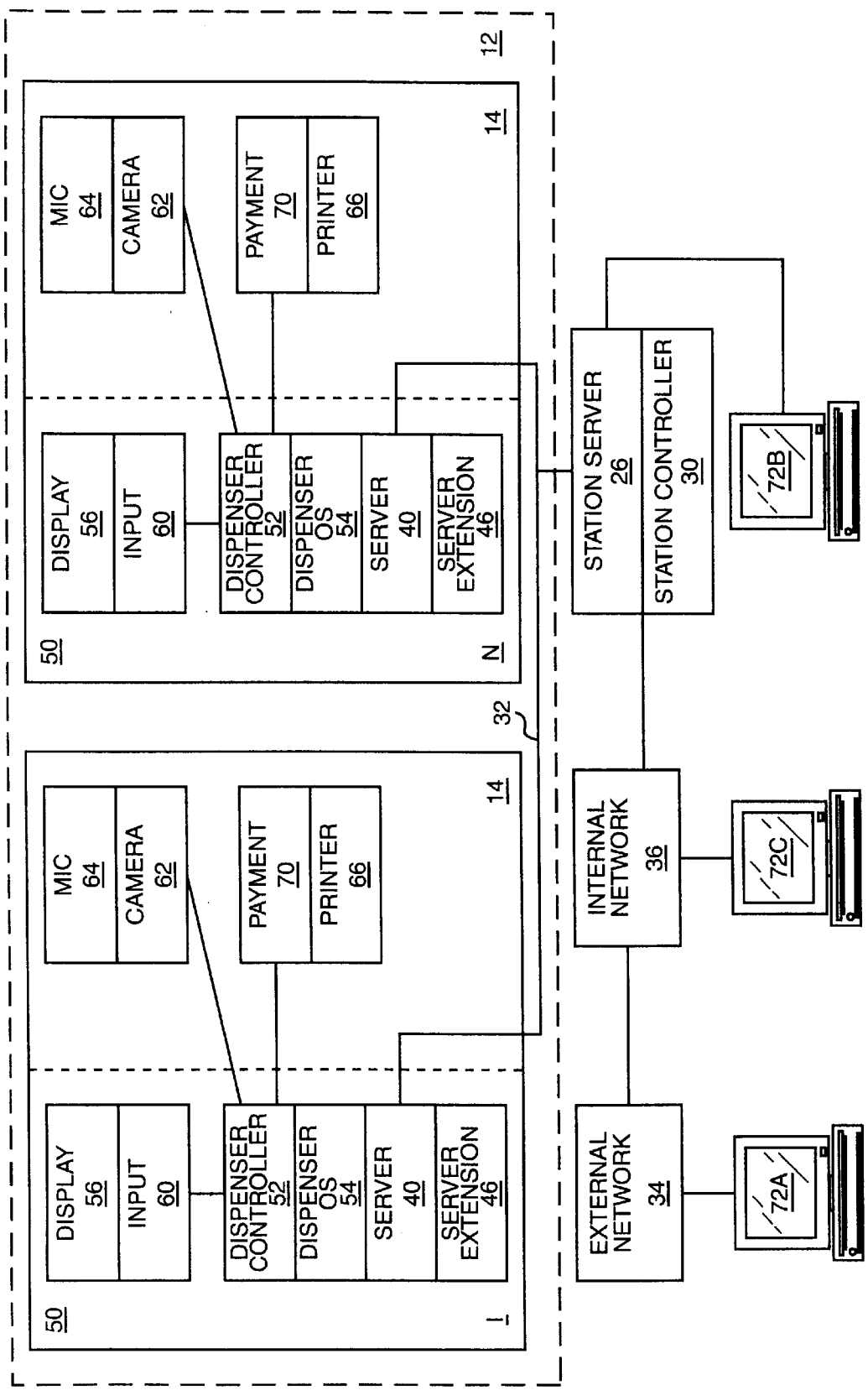
FIG. 4 is a schematic of the fuel dispensing system architecture of the system of FIG. 1, with internal network access to fuel dispensers via the station server and an external network access to the fuel dispensers via the internal network, with accompanying access devices.

FIG. 4 depicts an alternative embodiment to the configuration shown in FIG. 3. In FIG. 3, the external network 34 attaches to the internal network 36, which in turn connects to the station server 26 and ultimately to the dispenser server 40. Access to the web server can be accomplished via the same clients as described in FIG. 3. However, a client request from an external network 34 with the configuration depicted in FIG. 3 will instead route through the external network 34, the internal network 36, and the station server 26 to reach the dispenser server 40 on the dispenser 12. Access via the station server 26, station controller 30, client terminal 72B, and/or client terminal 72C will occur in the manner as shown in FIG. 3.

Figure 5:
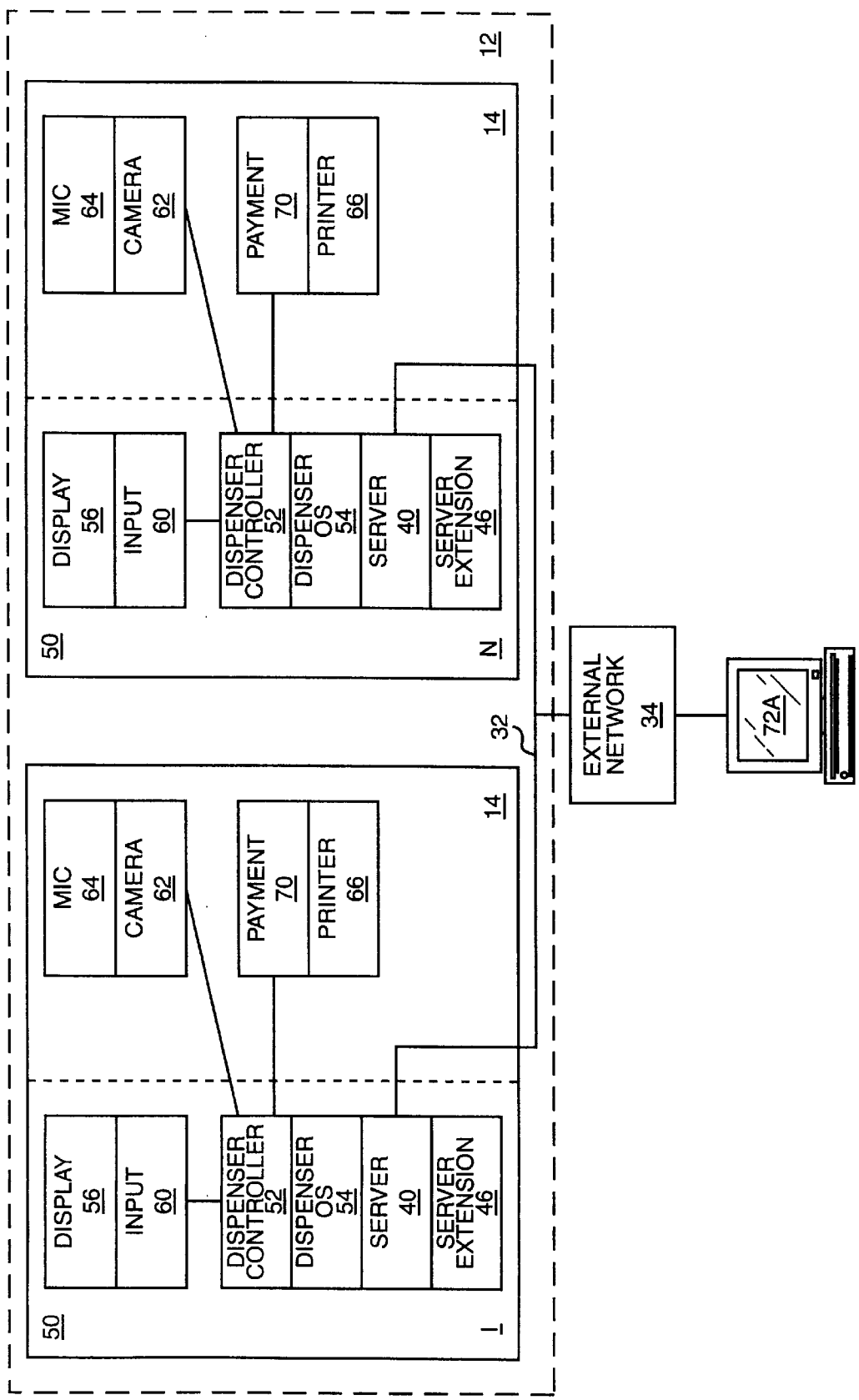
FIG. 5 is a schematic of the fuel dispensing system architecture of the system of FIG. 1, with external network access to the fuel dispenser system via a direct external connection, with accompanying access device.

FIG. 5 depicts another alternative embodiment of the invention. In FIG. 5, the client 72A directly accesses the dispenser server 40 via an external network 34. In this configuration, the dispenser 12 is directly attached to the external network 34, most often through an Internet Service Provider (ISP). Under this configuration, a client request will route through the external network 34 directly to the dispenser operating system 54 and dispenser server 40. Those skilled in the art will recognize further variations on these themes. Each variation is considered within the scope of this disclosure.

Figure 6:
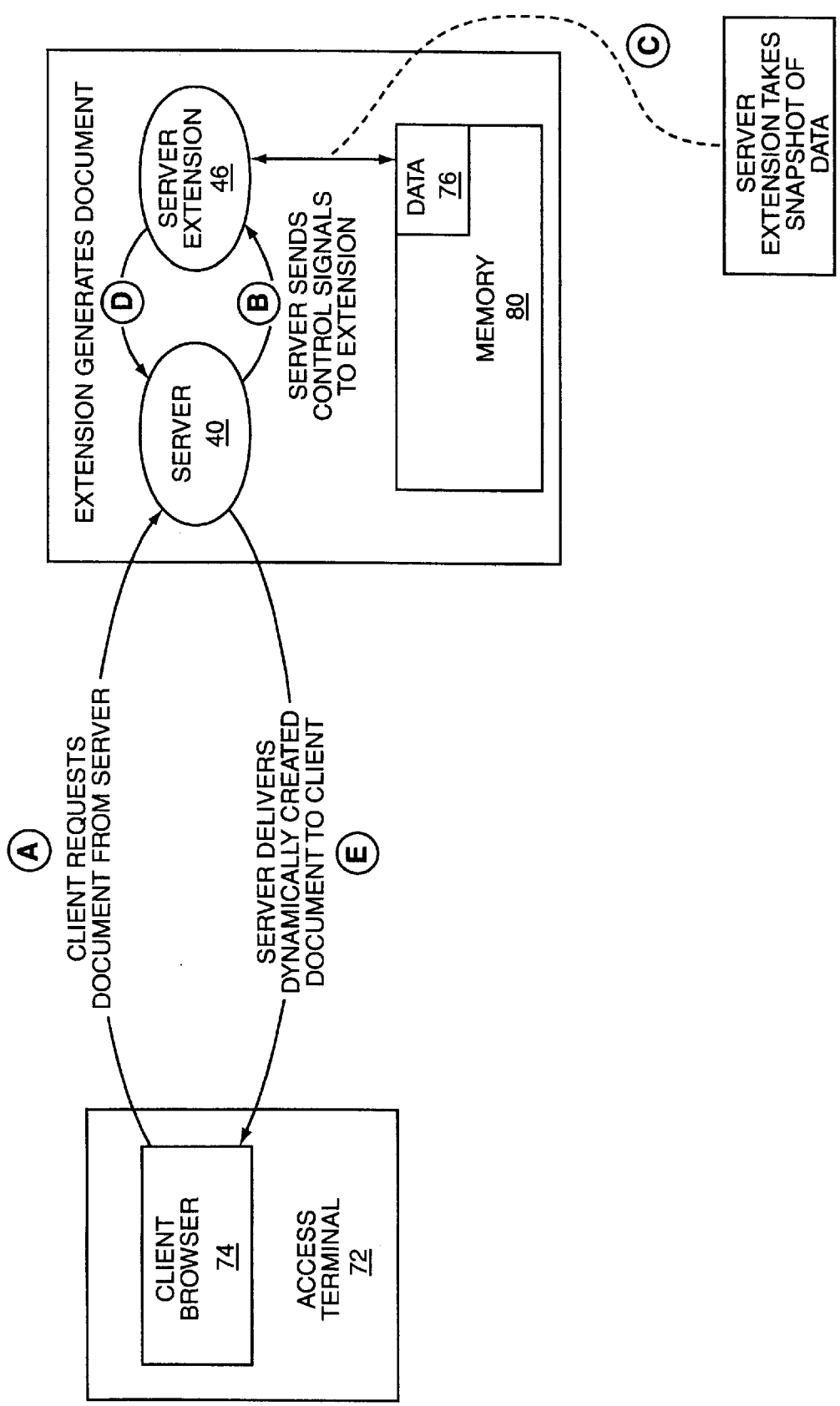
FIG. 6 is a flow chart of a process by which a fuel dispenser system of FIGS. 3, 4, or 5 would dynamically generate client-requested pages in response to a server generated request.

Turning to FIG. 6, a client request to dynamic document generation is shown in a process flow chart. In Step (A), a user sends a request from a client browser 74 on a client terminal 72. In Step (B), the dispenser server 40 generates and sends a request to the server extension 46. In Step (C), the server extension then takes a "snapshot" of the data 76 stored in the control system memory 80. In one embodiment, the server extension may take a "snapshot" of the data via the use of a Common Gateway Interface (CGI) script written in a script language. In Step (D), the server extension 46 dynamically generates a web page from data and returns it to the dispenser server 40. In Step (E), the dispenser server 40 delivers the dynamically created web page to the client browser 74. Each time this process is repeated, the web page will reflect any changes to the data 80 since the last request.

Figure 7:
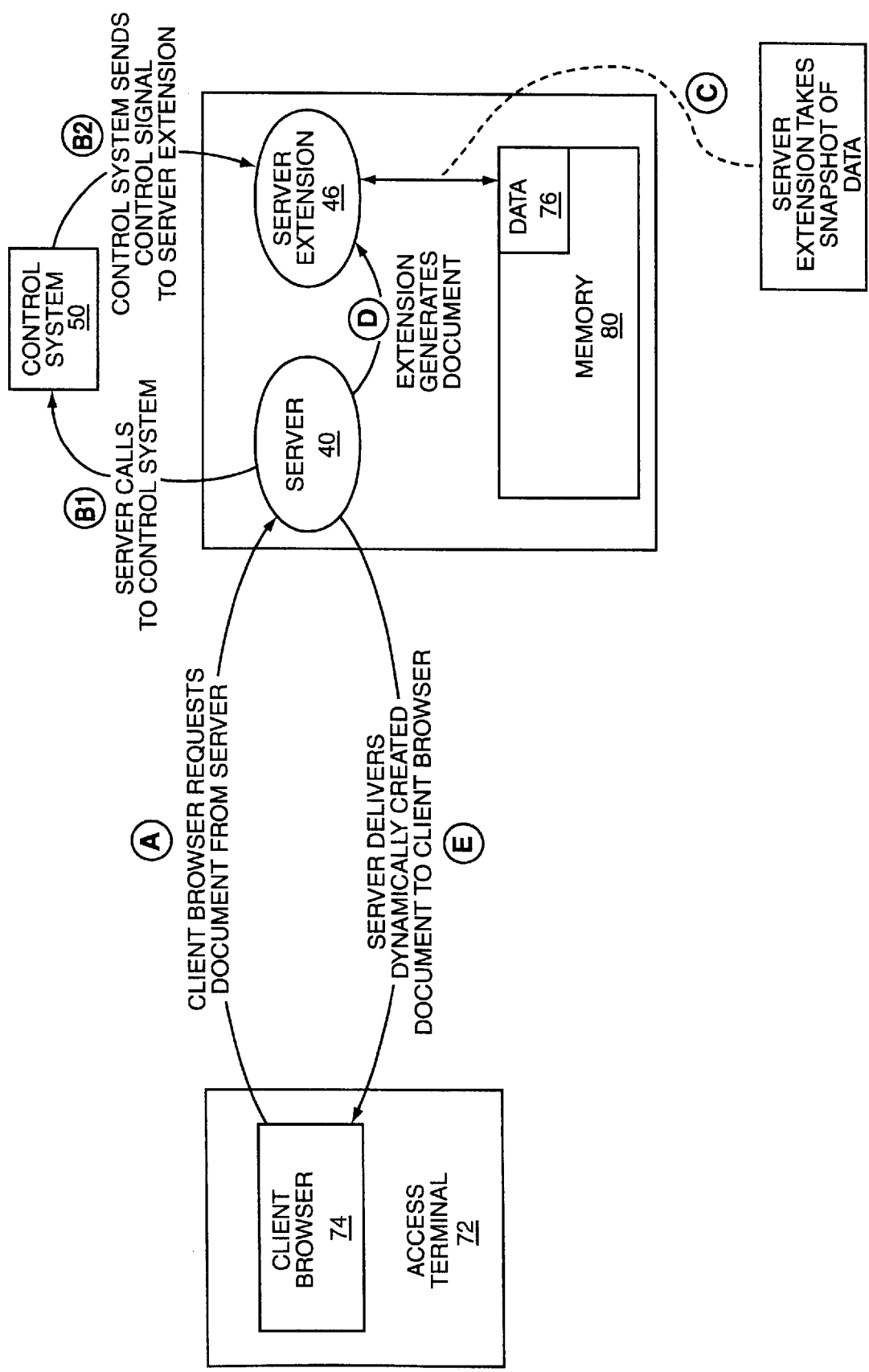
FIG. 7 is a flow chart of a process by which a fuel dispenser system of FIGS. 3, 4, or 5 would dynamically generate client-requested pages in response to a control system generated request.

FIG. 7 depicts an alternative flow chart for the dynamic document generation shown in FIG. 6. The steps in FIG. 7 mirror that of FIG. 6, except that the control system generates the signal to generate a page. Therefore, in FIG. 7 Step (B) from FIG. 6 is broken into two subparts. In Step (B)(1), the server passes the client request to the control system. In Step (B)(2), the control system generates and sends a request to the server extension 46. All other steps remain constant as between FIGS. 6 and 7.

Figure 8:
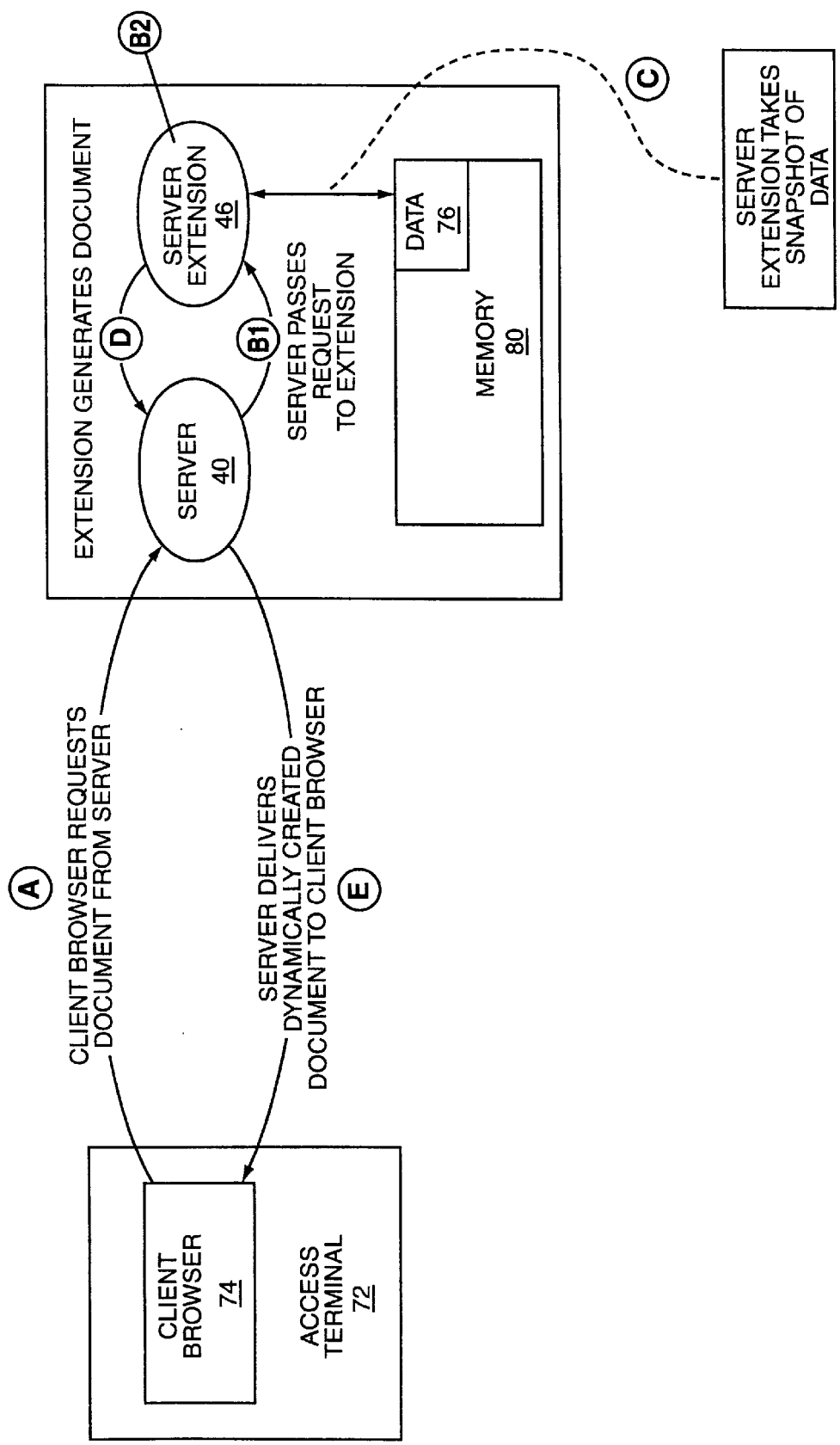
FIG. 8. a flow chart of a process by which a fuel dispenser system of FIGS. 3, 4, or 5 would dynamically generate client-requested pages in response to a server passed request.

FIG. 8 depicts another alternative flow chart for the dynamic document generation shown in FIG. 6. The steps in FIG. 8 mirror that of FIG. 6, except that the server extension generates the signal to generate a page. Therefore, in FIG. 8, Step (B) from FIG. 6 is broken into two subparts. In Step (B)(1), the server passes the client request to the server extension. In Step (B)(2), the server extension generates a self-request. All other steps remain constant as between FIGS. 6 and 8.

Figure 9:
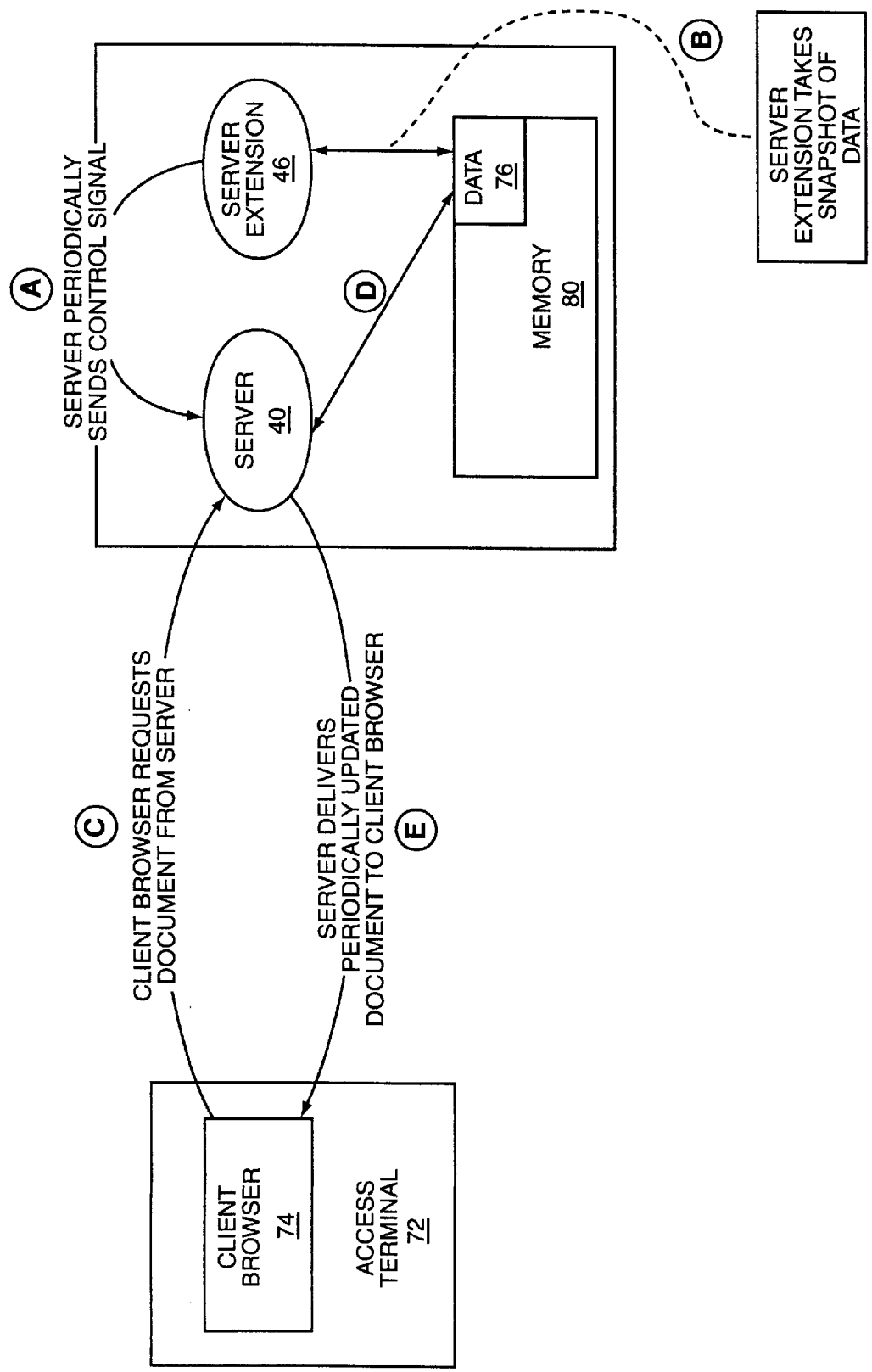
FIG. 9 is a flow chart of a process by which a fuel dispenser system of FIGS. 3, 4, or 5 would periodically generate client-requested pages in response to a server generated signal.

Turning to FIG. 9, scheduled document generation is shown in a process flow chart. In a preferred embodiment, scheduled document generation will be controlled according to a defined schedule. The schedule may be provided by an operating system process scheduler. In Step (A), the dispenser server 40 periodically generates and sends the control signal to the server extension 46. In Step (B), the server extension takes a "snapshot" of data 76 stored in the control system memory 80. In a preferred embodiment, the server extension will take a "snapshot" of the data via the use of a Common Gateway Interface (CGI) script written in a script language. In Step (C), the server extension 46 periodically generates a web page from data and stores it in memory 80. In Step (D), a user sends a request from a client browser 74 on a client 72. In Step (E), the dispenser server 40 delivers the stored web page from Step (B) to the client browser 74. Each time this process is repeated, the web page will reflect any changes to the data 80 since the last scheduled control signal.

Figure 10:
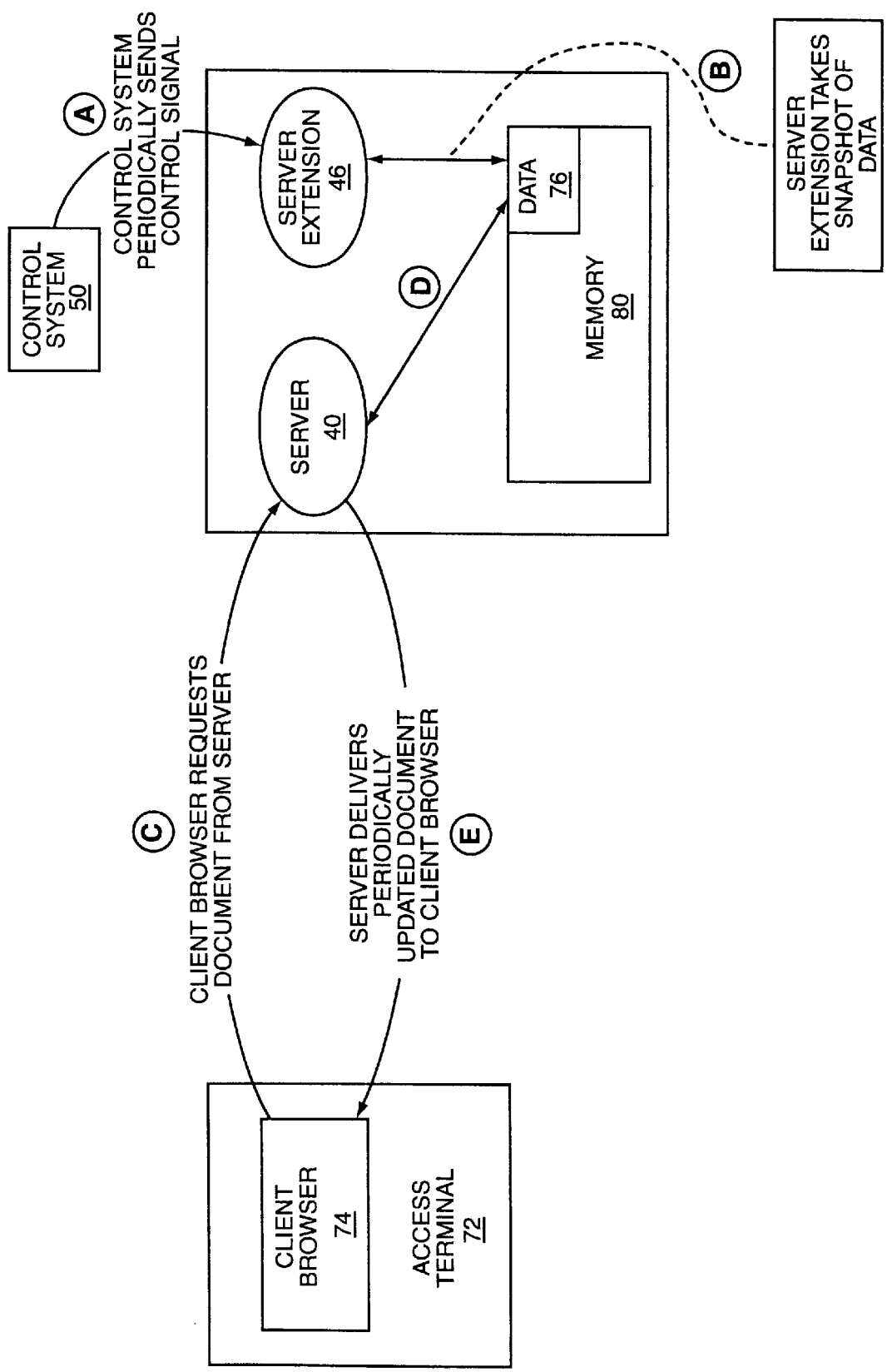
FIG. 10 is a flow chart of a process by which a fuel dispenser system of FIGS. 3, 4, or 5 would periodically generate client-requested pages in response to a control system generated signal.

FIG. 10 depicts an alternative origination for the scheduled control signal shown in FIG. 9. In FIG. 10 Step (A), control system 50 periodically generates and sends the control signal to generate a page to server extension 46. All other steps in FIG. 10 are identical to those in FIG. 9.

Figure 11:
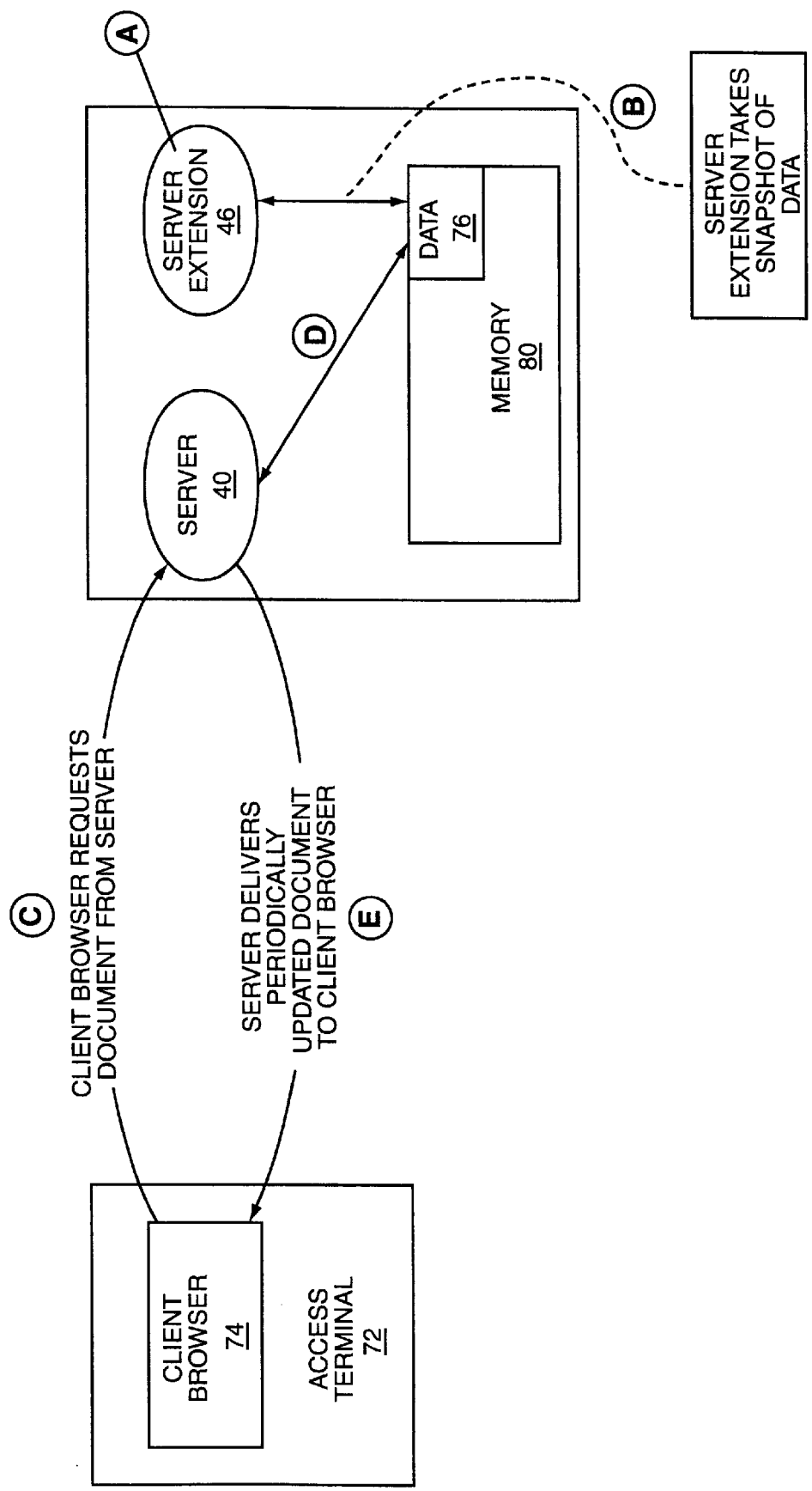
FIG. 11 is a flow chart of a process by which a fuel dispenser system of FIGS. 3, 4, or 5 would periodically generate client-requested pages in response to a server extension generated signal.

FIG. 11 depicts another alternative to FIG. 9, except that server extension 46 rather than the dispenser server 40 periodically generates the control signal to generate a page.

Figure 12:
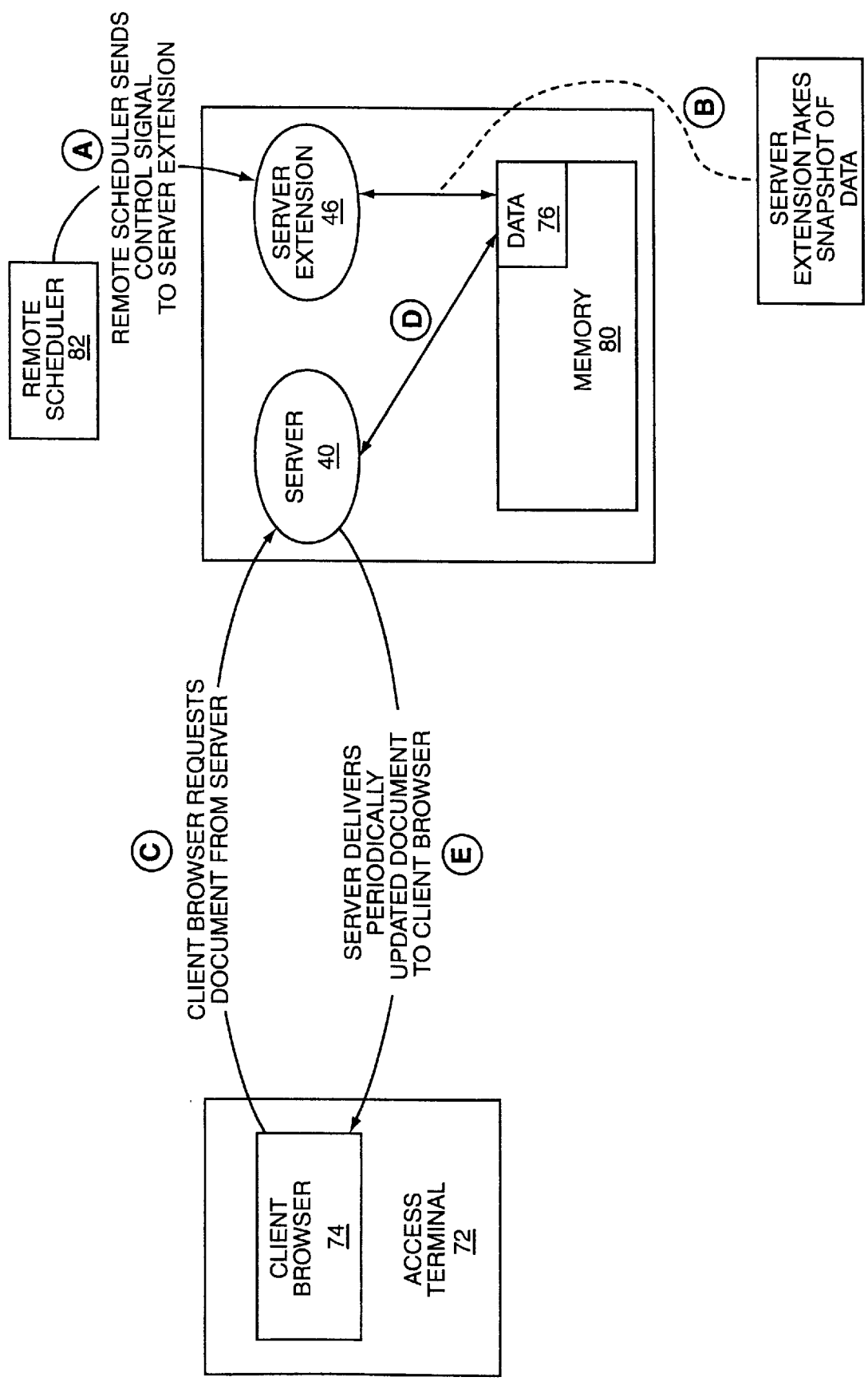
FIG. 12 is a flow chart of a process by which a fuel dispenser system of FIGS. 3, 4, or 5 would periodically generate client-requested pages in response to a remote scheduler generated signal.

FIG. 12 depicts another alternative to FIG. 9, except that a remote scheduler 82 rather than the dispenser server 40 periodically generates the control signal to generate a page. In a preferred embodiment of this remote scheduler, the periodic signal would be generated at station server 26 or station controller 30.

The information generated by the dispenser for remote client access may relate to any dispenser function or status, such as service, maintenance, and operations information, as well as purchasing and merchandising information. In short, any information at the dispenser is available for access in any desired format and arrangement.

Certain modifications and improvements will occur to those skilled in the art upon reading the foregoing description. It should be understood that all such modifications and improvements have been omitted for the sake of conciseness and readability, but are properly within the scope of the following claims.

We claim:

1. A dispensing system having a server comprising:
    a fuel dispenser having at least one fueling position to deliver fuel to a vehicle; and
    a control system and associated server within said fuel dispenser, said server having a communications interface for communications remote to said fuel dispenser.

2. The dispensing system of claim 1, wherein said server is associated with one of the group consisting of a network, a station server, an external network, and an internal network.

3. The dispensing system of claim 2, wherein at least one of said group is further attached to an external network.

4. A dispensing system having a server comprising:
    a fuel dispenser having at least one fueling position to deliver fuel to a vehicle;
    a control system and associated server within said fuel dispenser, said server having a communications interface for communications remote to said fuel dispenser; and
    a server extension associated with said control system and server, said server extension adapted to automatically generate an electronic document from information on said control system for access remote to said fuel dispenser via said server.

5. The dispensing system of claim 4 wherein said server is separate from said control system.

6. The dispensing system of claim 4 wherein said server is integrated within said control system.

7. The dispensing system of claim 4 wherein said server is a document server.

8. The dispensing system of claim 4 wherein said server is a world wide web server.

9. The dispensing system of claim 4 wherein said server extension dynamically generates the document as a result of receiving a control signal.

10. The dispensing system of claim 9 wherein said control system generates the control signal, triggering said server extension to dynamically generate the document.

11. The dispensing system of claim 9 wherein said server generates the control signal, triggering said server extension to dynamically generate the document.

12. The dispensing system of claim 9 wherein said server extension generates the control signal, triggering said server extension to dynamically generate the document.

13. The dispensing system of claim 4 wherein a control signal triggers said server extension to generate the document on a scheduled basis.

14. The dispensing system of claim 13, further including a process scheduler associated with said server and adapted to generate said control signal.

15. The dispensing system of claim 14, wherein said process scheduler is associated with said control system.

16. The dispensing system of claim 14, wherein said process scheduler is associated with a server remote to said fuel dispenser.

17. The dispensing system of claim 14, wherein said process scheduler is associated with a control system remote to said fuel dispenser.

18. The dispensing system of claim 4, wherein said server extension is implemented via hardware.

19. The dispensing system of claim 18, wherein said server extension is integrated with said control system.

20. The dispensing system of claim 18, wherein said server extension is integrated with said server.

21. The dispensing system of claim 18, wherein said server extension is separate from said server and said control system.

22. The dispensing system of claim 4, wherein said server extension is implemented via software.

23. The dispensing system of claim 22, wherein said server extension is integrated with said control system.

24. The dispensing system of claim 22, wherein said server extension is integrated with said server.

25. The dispensing system of claim 22, wherein said server extension is separate from said server and said control system.

26. A dispensing system having a server comprising:
    a fuel dispenser having at least one fueling position to deliver fuel to a vehicle;
    a control system and associated server within said fuel dispenser, said server having a communications interface for communications remote to said fuel dispenser, said server further adapted to generate an electronic document from information on said control system for access remote to said fuel dispenser via said server.

27. The dispensing system of claim 26, wherein said server is attached via a network connection to one of a group consisting of a station server, an external network, and an internal network.

28. The dispensing system of claim 26 wherein said server is separate from said control system.

29. The dispensing system of claim 26 wherein said server is integrated within said control system.

30. The dispensing system of claim 26 wherein said server is a document server.

31. The dispensing system of claim 26 wherein said server is a world wide web server.

32. The dispensing system of claim 26 wherein said server dynamically generates the document as a result of receiving a control signal.

33. The dispensing system of claim 32 wherein said control system generates the control signal, triggering said server to dynamically generate the document.

34. The dispensing system of claim 32 wherein said server generates the control signal, triggering said server to dynamically generate the document.

35. The dispensing system of claim 26 wherein a control signal triggers said server to generate the document on a periodic basis.

36. The dispensing system of claim 35, wherein one of the group consisting of said server, said control system, a server remote to said fuel dispenser, and a control system remote to said fuel dispenser generates said control signal.

37. The dispensing system of claim 26 further including a server extension to control generation of the document.

38. A method of dynamically generating a document on a fuel dispenser for viewing with a dispenser remote client, which comprises:

(a) requesting the document from the fuel dispenser via the client;

(b) generating a control signal;

(c) accessing the fuel dispenser data;

(d) generating a dynamic document reflecting the fuel dispenser data; and (e) serving the dynamically created document to the client.

39. A method of periodically generating a document on a fuel dispenser for viewing with a dispenser remote client, which comprises:

(a) generating a control signal according to a schedule;

(b) accessing the fuel dispenser data;

(c) generating a document reflecting the fuel dispenser data;

(d) requesting the document from the fuel dispenser; and (e) serving the document to the remote client.

* * * * *